United States Patent
Wang (10) Patent No.: US 9,477,722 B1
(45) Date of Patent: Oct. 25, 2016

(54) SLIDING WINDOW VIEW CONSTRUCTS IN RELATIONAL DATABASE QUERY LANGUAGE

(71) Applicant: ARRIS Solutions, Inc., Suwanee, GA (US)

(72) Inventor: Tony Wang, Portland, OR (US)

(73) Assignee: ARRIS Enterprises, Inc., Suwanee, GA (US)

( * ) Notice: Subject to any disclaimer, the term of this patent is extended or adjusted under 35 U.S.C. 154(b) by 251 days.

(21) Appl. No.: 13/905,704

(22) Filed: May 30, 2013

Related U.S. Application Data (60) Provisional application No. 61/774,061, filed on Mar. 7, 2013.

(51) Int. Cl.
  *G06F 7/00* (2006.01)
  *G06F 17/30* (2006.01)

(52) U.S. Cl.
  CPC ... *G06F 17/30554* (2013.01); *G06F 17/30383* (2013.01)

(58) Field of Classification Search
  CPC .............. G06F 17/30383; G06F 17/30516
  See application file for complete search history.

(56) References Cited

U.S. PATENT DOCUMENTS

| | | | |
|---|---|---|---|
| 7,299,216 B1 * | 11/2007 | Liang et al. | |
| 7,822,712 B1 * | 10/2010 | Robinson | G06F 17/30383 707/624 |
| 8,024,369 B2 * | 9/2011 | Pellegrini et al. | 707/802 |
| 2009/0182779 A1 * | 7/2009 | Johnson | G06F 17/30516 |
| 2009/0199301 A1 * | 8/2009 | Chandrasekaran et al. | 726/27 |
| 2010/0228752 A1 * | 9/2010 | Folting et al. | 707/758 |
| 2013/0007069 A1 * | 1/2013 | Chaliparambil | G06Q 50/22 707/803 |

\* cited by examiner

*Primary Examiner* — Taelor Kim
(74) *Attorney, Agent, or Firm* — Bart A. Perkins (57) ABSTRACT

This disclosure relates to populating a sliding window view comprising one or more rows associated with one or more view intervals. In some implementations of this disclosure, the sliding window view can store the history of previous view results and each row in the sliding window view can correspond to a fixed interval of time. In some implementations, the sliding window view can store a constant number of view results by purging existing view results within the sliding window view. The sliding window view can provide a user with a convenient and efficient means for displaying data summary tables corresponding to a period of time.

16 Claims, 5 Drawing Sheets

SLIDING WINDOW VIEW CONSTRUCTS IN RELATIONAL DATABASE QUERY LANGUAGE

CROSS REFERENCE TO RELATED APPLICATION

This application is a non-provisional application claiming the benefit of U.S. Provisional Application Ser. No. 61/774,061, entitled "An Extension to Materialized View Constructs in Relational Database Query Language," which was filed on Mar. 7, 2013, and is incorporated herein by reference in its entirety. U.S. Provisional Application Ser. No. 61/783,899, entitled "Optimizing Sliding Window View Constructs in Relational Database," which was filed on Mar. 14, 2013, and U.S. Nonprovisional application Ser. No. 13/905,684, entitled "Sliding Window View Group Constructs in Relational Database Query Language," which was filed on May 30, 2013, are incorporated herein by reference in their entirety.

TECHNICAL FIELD

This disclosure relates to populating a sliding window view on a recurring basis while storing multiple results as rows within the view.

BACKGROUND

Relational database query language (RDQL) can provide a user with a means for gathering and manipulating data that is stored in one or more databases. Generally, enterprise application developers are faced with the challenge of processing growing amounts of data efficiently and presenting the data in real-time in such a manner so as to meet complex operational and strategic requirements. In some cases, application developers rely on RDQL to organize large amounts of data into summary tables presented in a live dashboard. As an example, a live dashboard can contain aggregated data associated with some period of time.

Generally, materialized view constructs in RDQL can save pre-calculated query results in a temporary table, but the history of previous view results is lost. Moreover, in some circumstances, materialized views are unable to address naturally with aggregate functions. For example, existing materialized views are unable to allow aggregated data to be viewed in a sliding window where the aggregations are based on fixed time slices inside that window timeframe. As another example, existing materialized views are unable to allow data to be retained in a view that only falls into a certain period of time. A need exists for an extension of materialized view constructs in RDQL.

BRIEF DESCRIPTION OF THE DRAWINGS

Like reference numbers and designations in the various drawings indicate like elements.

DETAILED DESCRIPTION

In some implementations of this disclosure, systems and methods can operate to extend materialized view constructs in RDQL. Novel syntax can create a new type of materialized view, which can be referred to as a sliding window view. In some implementations of this disclosure, the sliding window view can store one or more previous view results and each row in the sliding window view can correspond to a fixed time slice. Each row in the sliding window view can be operable to store data or results corresponding to one or more operations carried out over the course of the fixed time slice associated with each row. The sliding window view can provide a user with a convenient and efficient means for displaying data summary tables corresponding to a period of time.

In some implementations of this disclosure, novel syntax in RDQL can create a sliding window view such that an existing sliding window view can be altered or dropped. Further, as an example, the novel syntax can save pre-calculated query results in a temporary table and save the history of previous view results in a temporary table such that the previous results can be based on a fixed time slice in a sliding window.

Figure 1:
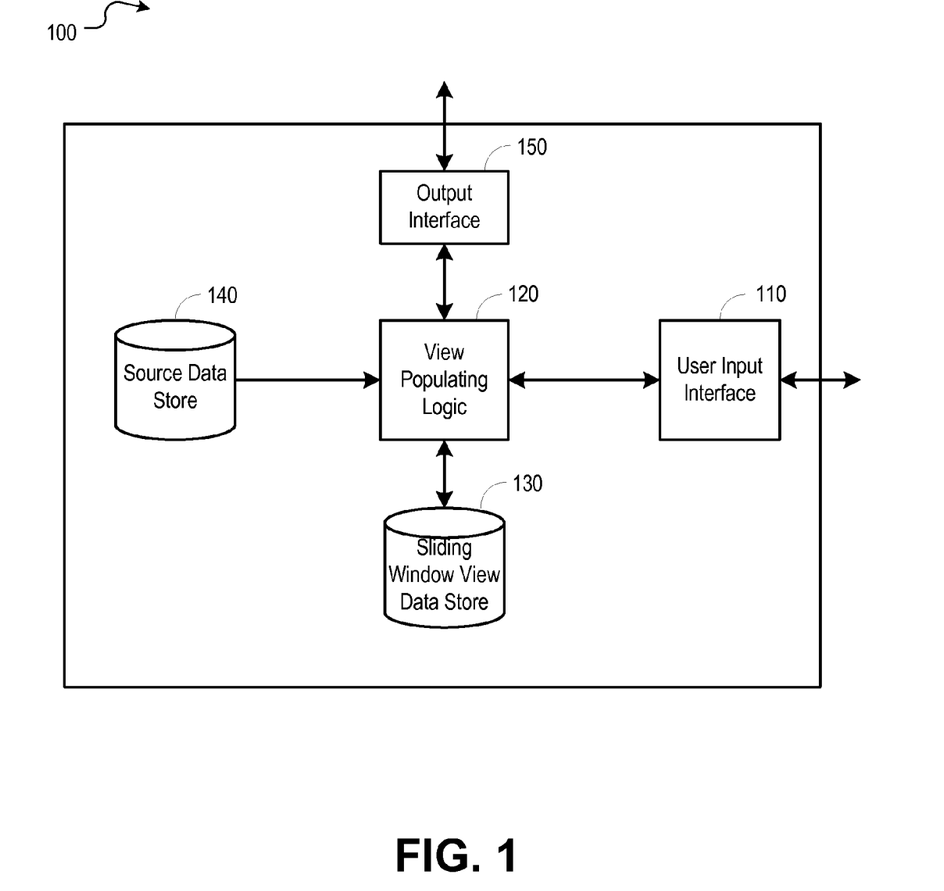
FIG. 1 is a block diagram illustrating an example system operable to facilitate populating a sliding window view on a recurring basis while storing multiple rows within the sliding window view.

FIG. 1 is a block diagram illustrating an example system 100 operable to facilitate populating a sliding window view on a recurring basis while storing multiple rows within the sliding window view. In some implementations, a sliding window view can be defined in a creation statement and can hold and/or display manipulated data from a source. For example, a sliding window view can comprise multiple rows over a perpetual or predetermined period of time, and each of the rows can comprise data associated with an interval of time (e.g., predetermined period of time corresponding to the data held in the sliding window view). In some implementations, a sliding window view can comprise a constant and predetermined number of rows. The system 100 can include a user input interface 110, view populating logic 120, a sliding window view data store 130, a source data store 140, and an output interface 150.

The user input interface 110 can be used to provide an interface between a user and the system 100. For example, the system 100 can receive data and instructions for operating on the data through the user input interface 110. In various implementations, user input can be organized into one or more queues. For example, data and instructions associated with a specific interval (e.g., status or identification data) can be held in a queue.

The view populating logic 120 can identify incoming data as source data and can direct source data to storage (e.g., source data store 140). For example, where view populating logic 120 identifies incoming data as source data, view populating logic can direct the data to be stored in a source data store 140. In various implementations, incoming data can be identified as source data where information/data associated with the incoming data matches predetermined criteria. For example, incoming data can be identified as source data where the data is associated with a predetermined interval type (e.g., minute, hour, day, month, etc.).

The view populating logic 120 can also be operable to generate materialized views (e.g., views that contain results of past and present queries). For example, view populating logic 120 can execute operations on data (e.g., incoming data, source data, etc.) in response to a user query. In various implementations, view populating logic 120 can direct past and present query results into materialized views and can further direct materialized views into storage (e.g., sliding window view data store 130). For example, a sliding window view data store 130 can be operable to store one or more materialized views comprising user query results.

The view populating logic 120 can also be operable to populate a sliding window view from one or more sources. For example, based on a requested query, view populating logic 120 can identify incoming source data and/or one or more sources stored in the source data store 140 to use in the population of a sliding window view. In various implementations, view populating logic 120 can be operable to identify the interval associated with a sliding window view (e.g., the specific minute, hour, day, month, etc. associated with the sliding window view) and to calculate the start time for the sliding window view based upon the identified interval.

The view populating logic 120 can also be operable to purge rows (e.g., previous view results) from a sliding window view. In various implementations, view populating logic 120 can remove a number of rows from a sliding window view based upon an identification of the number of retention rows associated with the sliding window view. For example, view populating logic 120 can calculate the difference between the number of rows in the sliding window view and the number of retention rows associated with the sliding window view, and can remove a number of rows equal to this difference from the sliding window view.

The sliding window view data store 130 can be operable to store one or more rows associated with one or more sliding window views. For example, the sliding window view data store 130 can store data associated with one or more views and/or the one or more rows within the views. In various implementations, data associated with a sliding window view can be held in storage external to the system 100.

The output interface 150 can be operable to provide an interface between the system 100 and a user or output device (not shown). For example, the output interface 150 can be used to transmit data associated with one or more sliding window views to a display device.

Figure 2:
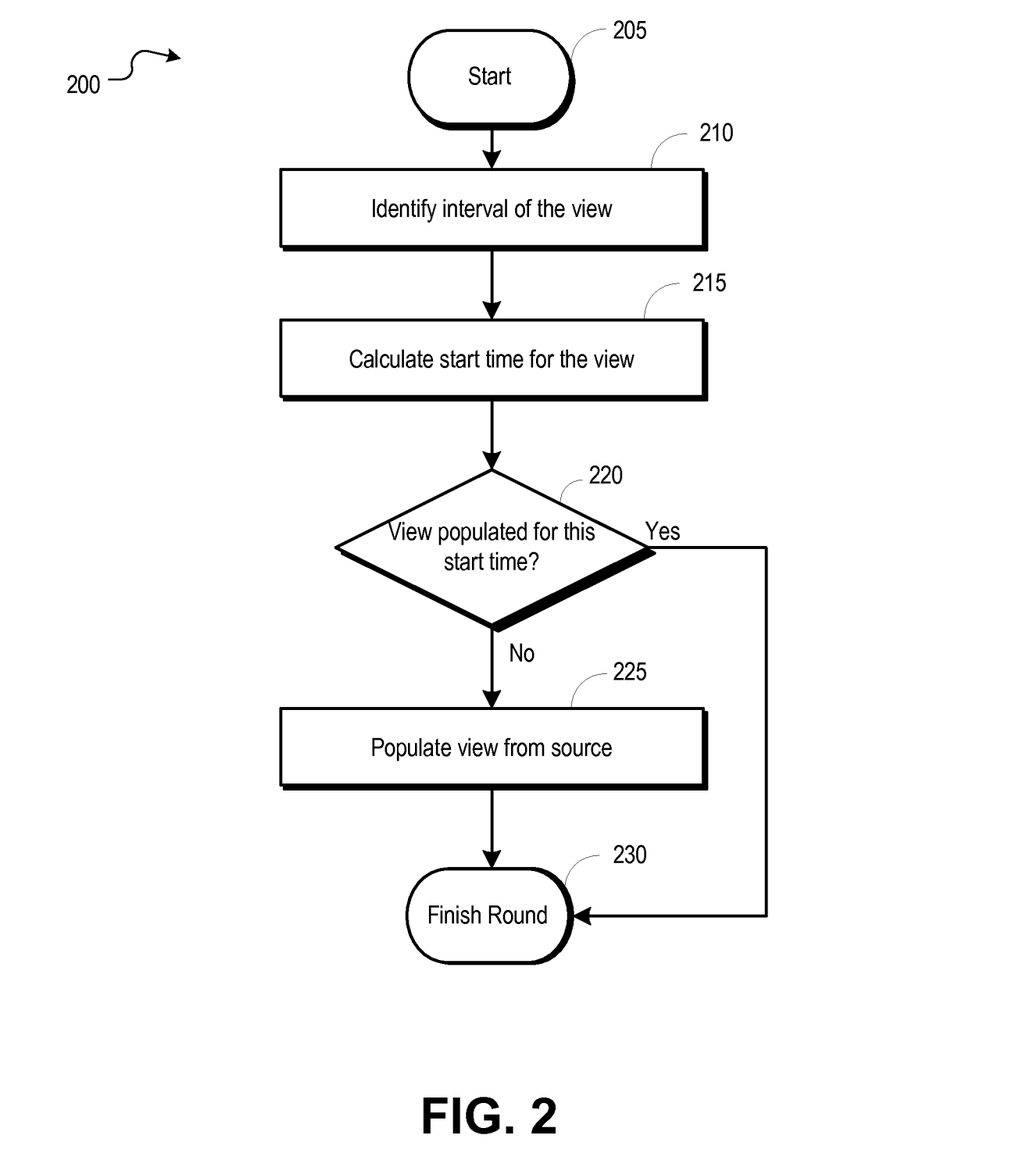
FIG. 2 is a flowchart illustrating an example, recurring process operable to populate a sliding window view.

FIG. 2 is a flowchart illustrating an example, recurring process 200 operable to populate a sliding window view. The process 200 can start at stage 205 when a recurring populating timer associated with the view (e.g., sliding window view) expires. For example, a recurring populating timer can be predetermined and set for a particular sliding window view. In various implementations, expiration of a recurring populating timer can trigger a view population process. In some implementations, the recurring populating timer can reset and start over after it expires. In various implementations, the process 200 can be operable to populate an individual row in a view (e.g., generate a single row in a sliding window view).

After the recurring populating timer expires, the process 200 can proceed to stage 210. At stage 210, an interval (e.g., a period of time, such as minute, hour, day, month, etc., over which one or more operations, or defined subquery, are executed) associated with the sliding window view can be identified. In some implementations, an interval associated with the sliding window view can be identified from the user query associated with the sliding window view.

After an interval associated with the sliding window view is identified, the process 200 can proceed to stage 215. At stage 215, a start time associated with a row in the sliding window view can be calculated. A start time associated with a row in the sliding window view can be calculated, for example, by logic within a database system (e.g., view populating logic 120 of FIG. 1). In some implementations, the start time can be calculated based upon the interval associated with the sliding window view (e.g., the interval identified at stage 210) and a current time or count. For example, the start time can be the nearest interval threshold preceding the current time (e.g., where the interval is a minute and the current timestamp is 10:01:29 (hour:minute: second), the start time can be 10:01:00). In various implementations, a sliding window view can comprise a single row for each start time within a predetermined period of time.

After a start time associated with a row in the sliding window view is calculated, the process 200 can proceed to stage 220. At stage 220, a determination can be made whether a row in the sliding window view has already been populated for the currently identified start time. A determination whether a row has already been populated for the currently identified start time can be made, for example, by logic within a database system (e.g., view populating logic 120 of FIG. 1). For example, view populating logic can check the sliding window view for a row associated with the current start time. If a determination is made that a row has not already been populated for the currently identified start time, the process 200 can proceed to stage 225.

At stage 225, a row in the sliding window view can be populated from source data or one or more source views. The row can be populated, for example, by logic within a database system (e.g., view populating logic 120 of FIG. 1). For example, view populating logic can retrieve and/or manipulate source data from storage (e.g., source data store 140 of FIG. 1) and can generate one or more rows in the sliding window view from the retrieved/manipulated source data or views. After the sliding window view is populated, the process 200 can end the current view population round at stage 230.

Returning to stage 220, if a determination is made that a row has already been populated for the start time associated with the current round, the process 200 can end the current round of populating at stage 230.

In some implementations, the process 200 can start over from stage 205 when the recurring populating timer associated with the sliding window view next expires.

Figure 3:
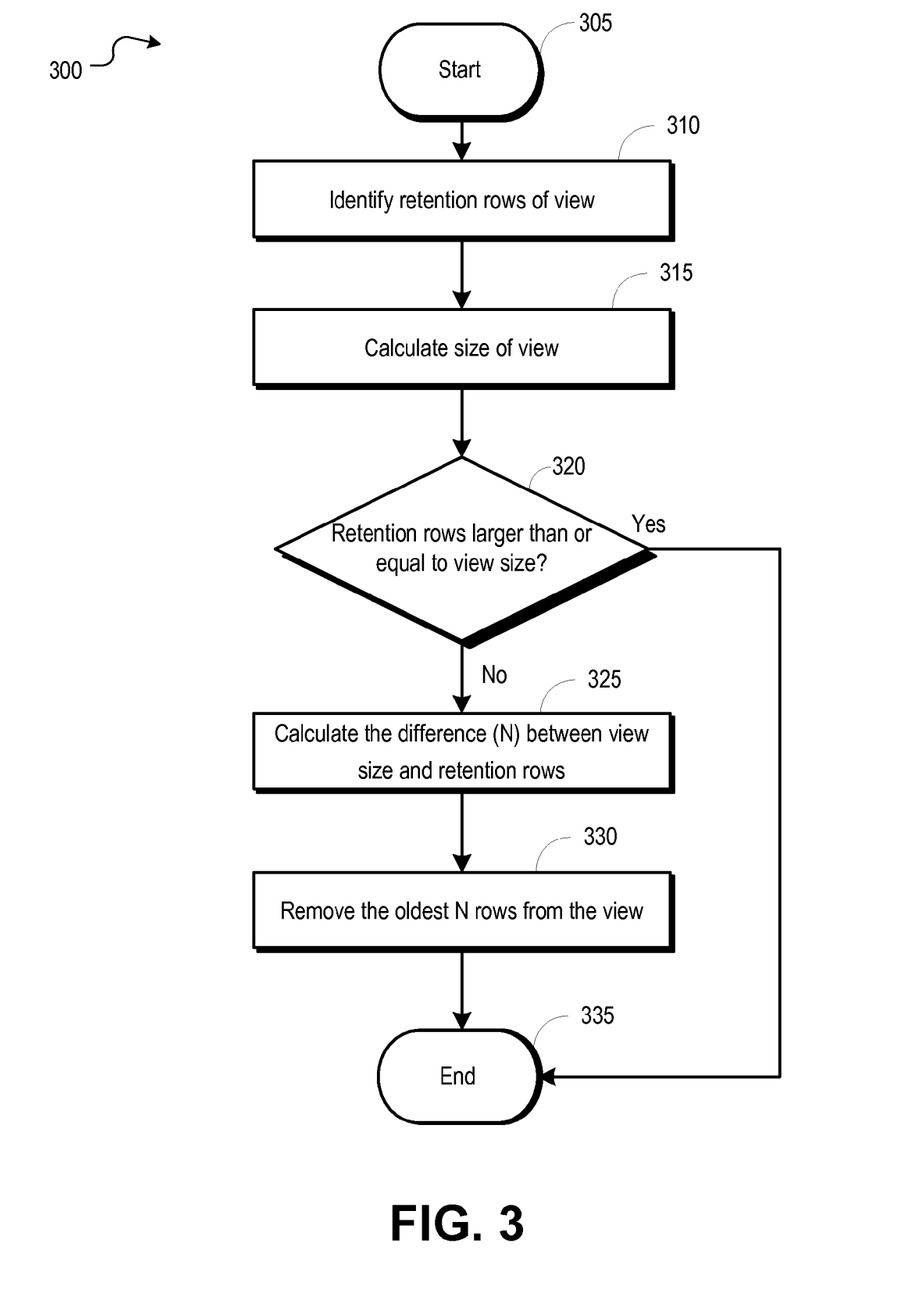
FIG. 3 is a flowchart illustrating an example process operable to purge rows from a sliding window view based upon the difference between the number of rows in the sliding window view and a predetermined number of retention rows.

FIG. 3 is a flowchart illustrating an example process 300 operable to purge one or more rows from a sliding window view based upon the difference between the number of rows in the sliding window view and a predetermined number of retention rows. The process 300 can start at stage 305 when a recurring purging timer associated with the sliding window view expires. For example, a recurring purging timer can be predetermined and set for a particular sliding window view. In various implementations, expiration of a recurring purging timer can trigger a purging process. In some implementations, the recurring purging timer can reset and start over after it expires.

After the recurring purging timer expires, the process 300 can proceed to stage 310. At stage 310, the number of retention rows (e.g., a defined number of rows a sliding window view may hold) associated with the sliding window view can be identified. The number of retention rows associated with the sliding window view can be identified, for example, by logic within a database system (e.g., view populating logic 120 of FIG. 1). In some implementations, a number of retention rows associated with the sliding window view can be identified from the user query associated with the sliding window view. For example, the number of retention rows associated with the sliding window view can be predetermined and set for a particular sliding window view.

After the number of retention rows associated with the sliding window view is identified, the process 300 can proceed to stage 315. At stage 315, the size of the sliding window view can be calculated. The size of the sliding window view can be calculated, for example, by logic within a database system (e.g., view populating logic 120 of FIG. 1). For example, the size of the sliding window view can be based upon a calculation of the number of rows in the sliding window view.

After the size of the sliding window view is calculated, the process 300 can proceed to stage 320. At stage 320, a determination can be made whether the number of retention rows associated with the sliding window view is larger than the calculated size of the sliding window view. The determination can be made, for example, by logic within a database system (e.g., view populating logic 120 of FIG. 1). In some implementations, the determination can be based on a comparison between the number of retention rows identified at stage 310 and the number of rows in the sliding window view as calculated at stage 315. If a determination is made that the retention rows associated with the sliding window view are not larger in number than the calculated size of the sliding window view, the process 300 can proceed to stage 325.

At stage 325, the difference between the number of retention rows and the number of rows in the sliding window view can be calculated. The difference between the number of retention rows and the number of rows in the sliding window view can be calculated, for example, by logic within a database system (e.g., view populating logic 120 of FIG. 1). In some implementations, the difference between the number of retention rows and the number of rows in the sliding window view can be calculated by subtracting the number of retention rows (e.g., the number identified at stage 310) from the number of rows in the sliding window view (e.g., the number calculated at stage 315).

After the difference between the number of retention rows and the number of rows in the sliding window view is calculated, the process 300 can proceed to stage 330. At stage 330, the oldest rows in the sliding window view can be removed from the sliding window view until the number of rows in the sliding window view is equal to or less than the number of retention rows associated with the sliding window view. The oldest rows in the sliding window view can be removed, for example, by logic within a database system (e.g., view populating logic 120 of FIG. 1). For example, the number of rows removed from the sliding window view can be equal to the difference between the number of retention rows and the number of rows in the sliding window view (e.g., the number calculated at stage 325). After the oldest rows in the sliding window view are removed, the process 300 can end at stage 335.

Returning to stage 320, if a determination is made that the retention rows associated with the sliding window view are not larger in number than the calculated size of the sliding window view, the process 300 can end at stage 335.

In some implementations, the process 300 can start over from stage 305 when the recurring purging timer associated with the sliding window view next expires.

Figure 4:
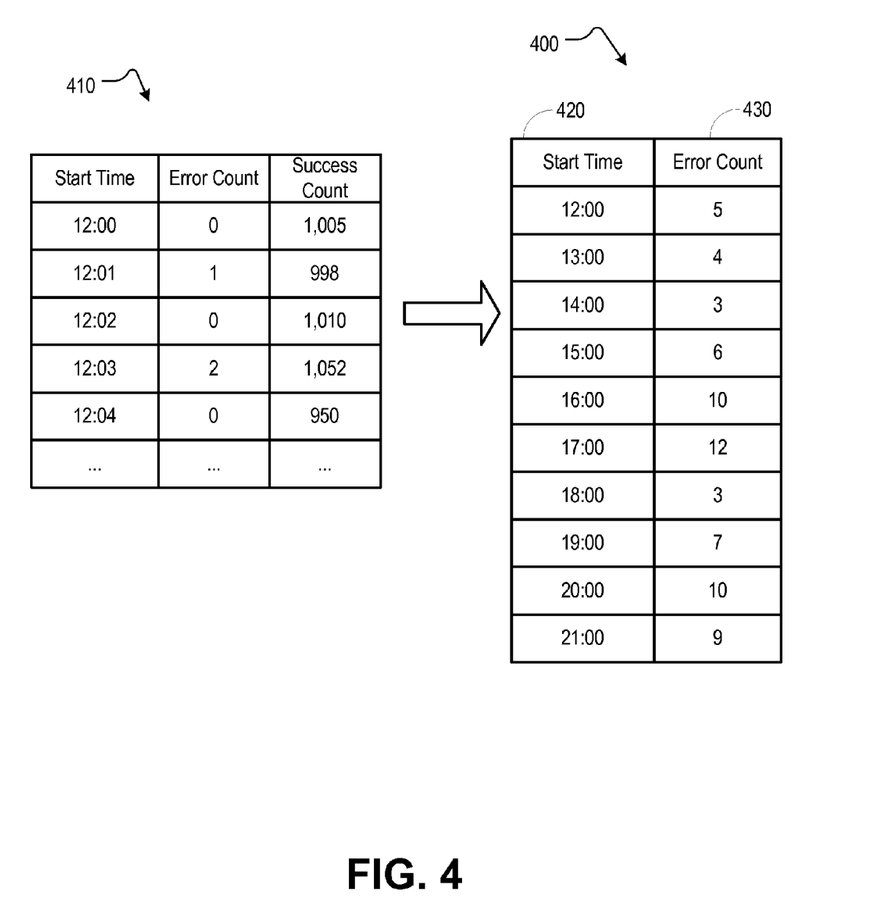
FIG. 4 is an example illustration of a sliding window view.

FIG. 4 is an example of a sliding window view 400 operable to store data associated with a predetermined number of rows. In some implementations, a sliding window view can store results and/or data associated with various applications and queries. For example, the sliding window view 400 stores hourly counts of the number of error results obtained by a query for monitoring the overall health of a system. In various implementations, a sliding window view can store results and/or data aggregated from data input directly into or streamed into the sliding window view (e.g., data held in the minute error count view 410). For example, the minute error count view 410 stores results of operation status queries (e.g., the number of queries returning a successful result and the number of queries returning an error) in order to monitor the overall health of a system.

In some implementations, each row of the sliding window view 400 can comprise an individual view result. For example, an individual view result can comprise results of one or more operations that are carried out over some predetermined period of time (e.g., an interval associated with the sliding window view). In some implementations, the sliding window view 400 can comprise a column that identifies an individual view result (e.g., start time column 420) and one or more columns containing data associated with the individual view result (e.g., error count column 430).

In some implementations, a sliding window view can be created, and view interval, constant size of the sliding window view, and frequency of view population and purging can be defined using the following structured query language (SQL) statement:

TABLE 1

CREATE SLIDINGWINDOW VIEW
[schema.]name
INTERVAL timeframe
POPULATETIMER period
[RETENTION rows
PURGETIMER period]
AS
subquery Referring to the example in TABLE 1, the statement "CREATE SLIDINGWINDOW VIEW" can indicate that a sliding window view is created and that its contents are persistent until purged. In some implementations, the rows in the sliding window view can be operable to store data associated with the rows.

Referring to the example in TABLE 1, the statement "INTERVAL timeframe" can define a period of time over which one or more operations (e.g., a defining subquery) can be executed, hereinafter referred to as a "view interval." In some implementations, the view interval can be either a fixed timeframe (e.g., a fixed number of seconds, minutes, hours, etc.) or a logical timeframe (e.g., one or more months). In some implementations, a logical timeframe can be a member of a set of timeframe literals as follows: {"millisecond", "second", "minute", "hour", "day", "week", "month", "quarter", "year", "decade", "century", "millennium"}.

Referring to the example in TABLE 1, the statement "RETENTION rows" can define a number of rows to be held or stored in the sliding window view at any given moment in time. In some implementations, where a number of rows to be held or stored is not defined, each previous view result in the sliding window view can be held or stored in perpetuity or until the sliding window view is dropped.

Referring to the example in TABLE 1, the statement "PURGETIMER period" can define a frequency in which rows are purged from a sliding window view. In some implementations, a timer can count down from a predetermined period of time (e.g., the value of "period"), and when the timer expires, a process of purging one or more rows from the sliding window view can begin. In various implementations, after the timer expires, the timer can reset to the same or a different predetermined period of time.

Referring to the example in TABLE 1, the statement "POPULATETIMER period" can define a frequency in which a sliding window view is populated. In some implementations, a timer can count down from a predetermined period of time (e.g., the value of "period"), and when the timer expires, a process of populating a sliding window view can begin. In various implementations, after the timer expires, the timer can reset to the same or a different predetermined period of time. In some implementations, a single view populating timer can exist in a sliding window view creation statement.

By way of example, the following SQL statement (TABLE 2) can create a sliding window view 400 that is operable to store results obtained from a query of a relational database for service and/or outage records in a network.

TABLE 2

CREATE SLIDINGWINDOW VIEW
operation_error_hourly
INTERVAL 3600
POPULATETIMER 600
RETENTION 10
PURGETIMER 1800
AS
SELECT
   SUM(CASE WHEN op_status=2 THEN 1 ELSE 0 END)
   AS error
FROM operation Referring to the example in TABLE 2, the statement "operation_error_hourly" can identify the sliding window view 400 as a view operable to store the results of a query for the number of errors received over a one hour period. The example statement of TABLE 2 can create the sliding window view 400, the sliding window view 400 being operable to store a count of the number of error results experienced by a system (e.g., network) over individual one hour intervals, wherein each one hour interval is represented by an individual row in the sliding window view 400 (e.g., a row in the start time column 420), and the sliding window view 400 constantly retains ten rows in the start time column 420.

Referring to the example in TABLE 2, the statement "INTERVAL 3600" can define the period of time (e.g., 3,600 seconds or one hour) over which the hourly count sub-query is to be executed. As a result, each individual row or view within the sliding window view 400 comprises results obtained from a query conducted over an interval of one hour (e.g., the sliding window view 400 has a view interval of one hour).

Referring to the example in TABLE 2, the statement "RETENTION 10" can define the number of rows to be held or stored in the sliding window view 400 at any given moment in time (e.g., the sliding window view 400 can store ten individual hourly rows or views).

Referring to the example in TABLE 2, the statement "PURGETIMER 1800" can define a frequency in which rows are purged from the sliding window view 400. For example, a timer can count down from 1800 seconds (30 minutes), and when the timer expires, a process of purging a number of rows from the sliding window view 400 can begin. For example, the sliding window view 400 can retain ten individual rows because the number of retention rows is defined as ten. In various implementations, after the timer expires, the timer can reset to 1800 seconds (30 minutes).

Referring to the example in TABLE 2, the statement "POPULATETIMER 600" defines the frequency in which the sliding window view 400 is populated. For example, a determination is made whether a specific individual row needs populating every 600 seconds (10 minutes). In some implementations, a timer can count down from 600 seconds, and when the timer expires, a process of populating an individual row associated with the current time can begin. In various implementations, after the timer expires, the timer can reset to 600 seconds.

Referring to the example in TABLE 2, the statement "SELECT SUM(CASE WHEN op_status=2 THEN 1 ELSE 0 END) AS error," in combination with "FROM operation," can define the query to be carried out and the results of which are to be stored in the sliding window view 400. For example, the statement defines the data that is to be stored in the error count column 430 in the sliding window view 400.

In some implementations, a start time associated with a row can be calculated based upon the interval associated with the sliding window view (e.g., the period of time corresponding to results held by the sliding window view) and a current time or count. For example, the start time can be the nearest interval threshold preceding the current time (e.g., the rows in the sliding window view 400 each have an interval of one minute, thus the start times of each of the rows are spaced one minute apart from each other). In various implementations, a sliding window view can comprise rows for each start time within a predetermined period of time. For example, the sliding window view 400 shows each start time within a ten (10) hour period beginning at 12:00.

In some implementations, a sliding window view can comprise a predetermined number of rows. For example, the sliding window view 400 comprises ten (10) rows. In various implementations, a sliding window view can comprise a constant number of rows by purging existing rows from the sliding window view before or after adding a row to the sliding window view. For example, the number of rows held in the sliding window view 400 can remain constant by removing the 12:00 row (e.g., the oldest row in the sliding window view) before adding a row with a start time of 22:00.

Figure 5:
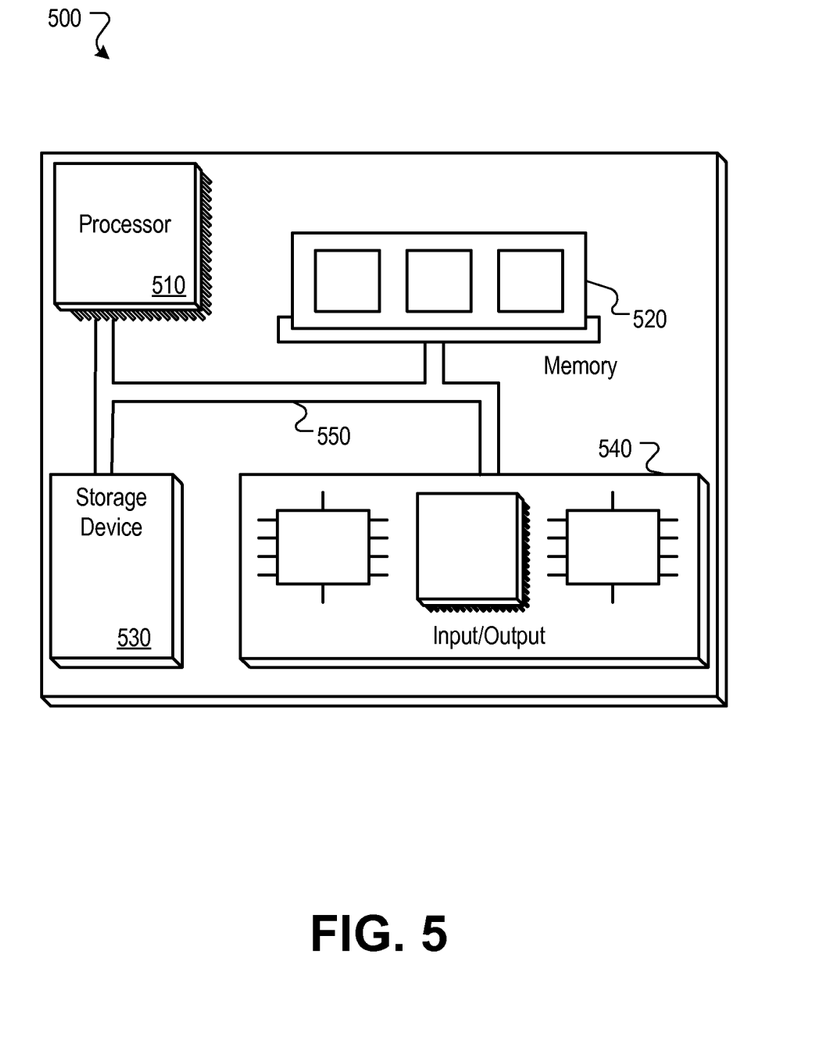
FIG. 5 is a block diagram illustrating an example hardware configuration operable to populate a sliding window view and store multiple rows within the sliding window view.

FIG. 5 is a block diagram of a hardware configuration 500 operable to facilitate populating and/or purging a row on a recurring basis while storing multiple rows within the sliding window view. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500. In some implementations, the storage device 530 can store data in one or more data stores (e.g., sliding window view data store 130 and/or source data store 140).

The input/output device 540 provides input/output operations for the hardware configuration 500. In one implementation, the input/output device 540 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In another implementation, the input/output device can include driver devices configured to receive input data and send output data to other input/output devices, such as one or more display devices (e.g., television screen, computer monitor, etc.). In other implementations, the input/output device can include driver devices configured to receive input data from one or more user input devices (e.g., keyboard, pointer device, etc.).

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal (e.g., a machine generated electrical, optical, or electromagnetic signal) that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display (e.g., a CRT (cathode ray tube) or LCD (liquid crystal display) monitor) for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
   receiving information associated with one or more characteristics of a sliding window view, wherein the information is received as a structured query language statement, and wherein the information associated with one or more characteristics of the sliding window view comprises:
      a duration of a population timer, the duration of the population timer controlling the frequency at which the sliding window view is updated;
      a duration of time within which results of a received query are summarized; and
      an identification of a number of rows in the sliding window view to keep populated;
   generating the sliding window view, wherein the sliding window view comprises a plurality of rows, wherein a first row of the plurality of rows represents a current time interval and the other rows of the plurality of row represent one or more time intervals that precede the current time interval;
   determining a start time for each respective row of the plurality of rows, wherein the start time for each respective row;
   retrieving a query result summary for each respective row of the plurality of rows, the query result summary comprising a summary of the query results obtained for a period of time beginning at the start time associated with the respective row and lasting for the duration of time within which results of the received query are summarized;
   wherein retrieving the query result summary for at least one of the plurality of rows comprises retrieving one or more prior query result summaries from a previously generated sliding window view, the one or more prior query result summaries sharing a time-based relationship with the intervals associated with the rows of the sliding window view;
   populating each respective row of the plurality of rows with the retrieved query result summary associated with the respective row;
   calculating the number of populated rows in the sliding window view;
   determining whether the number of populated rows in the sliding window view is greater than the number of rows in the sliding window view to keep populated; and
   removing a number of rows from the sliding window view if the number of populated rows in the sliding window view is greater than the number of rows in the sliding window view to keep populated, wherein the number of rows to remove from the sliding window view is equal to the difference between the number of populated rows and the number of rows in the sliding window view to keep populated;
   outputting the populated plurality of rows within the sliding window view to a display; and
   when the population timer expires:
      resetting and restarting the population timer;
      storing the one or more populated rows for analysis; and
      generating a new row within the sliding window view, wherein the new row represents the time interval immediately following the current time interval.

2. The computer-implemented method of claim 1, wherein the duration of time within which results of a received query are summarized comprises one or more seconds, minutes, hours, days, months or years.

3. The computer-implemented method of claim 1, wherein the sliding window view is associated with a predetermined period of time, and each of the one or more rows in the sliding window view is associated with a predetermined portion of the predetermined period of time associated with the sliding window view.

4. The computer-implemented method of claim 1, further comprising:
   displaying a portion of the populated rows in the sliding window view.

5. The computer-implemented method of claim 1, wherein rows in the sliding window view are populated according to a predetermined schedule or frequency.

6. The computer-implemented method of claim 1, wherein the number of rows removed from the sliding window view is removed from the sliding window view in an order from the oldest row in the sliding window view to the newest row in the sliding window view.

7. The computer-implemented method of claim 1, wherein rows are removed from the sliding window view according to a predetermined schedule or frequency.

8. A system, comprising:
one or more interfaces operable to be used to receive a user query and data associated with the user query and to transmit data associated with one or more views, wherein the user query comprises a structured query language statement identifying:
a duration of a population timer, the duration of the population timer controlling the frequency at which a sliding window view is updated;
a duration of time within which results of a received query are summarized; and
an identification of a number of rows in the sliding window view to keep populated;
a data store operable to store computer program instructions; and
a processor operable to execute said computer program instructions, the computer instructions being operable to cause the processor to:
create a table associated with a sliding window view, wherein the table comprises one or more rows, wherein each of the one or more rows is associated with a time interval comprising a start time and the duration of time within which results of the received query are summarized;
identify an interval associated with the sliding window view when a population timer expires;
perform one or more operations for the duration of the interval associated with the sliding window view and populate one or more rows in the table with results of the one or more operations;
populate at least one row within the table using one or more prior query result summaries from a previously generated sliding window view, wherein the one or more prior query result summaries shares a time-based relationship with the at least one row;
calculate the number of populated rows in the sliding window view;
determine whether the number of populated rows in the sliding window view is greater than the number of rows in the sliding window view to keep populated; and
remove a number of rows from the sliding window view if the number of populated rows in the sliding window view is greater than the number of rows in the sliding window view to keep populated, wherein the number of rows to remove from the sliding window view is equal to the difference between the number of populated rows and the number of rows in the sliding window view to keep populated;
when the population timer expires:
reset and restart the population timer; and
generate a new row within the table, wherein the new row represents a most recent time interval for which query results are available.

9. The system of claim 8, wherein each of the one or more rows in the table is associated with a period of time that is equivalent to the interval associated with the sliding window view.

10. The system of claim 8, wherein each of the one or more rows in the table is associated with a predetermined portion of the interval associated with the sliding window view.

11. The system of claim 8, wherein the number of rows removed from the table is removed from the table in an order from the oldest row in the table to the newest row in the table.

12. The system of claim 8, wherein rows are removed from the table according to a predetermined schedule or frequency.

13. One or more non-transitory computer readable media operable to execute on one or more processors, the computer readable being operable to cause the one or more processors to perform the operations comprising:
receiving information associated with one or more characteristics of a sliding window view, wherein the information is received as a structured query language statement, and wherein the information associated with one or more characteristics of the sliding window view comprises:
a duration of a population timer, the duration of the population timer controlling the frequency at which the sliding window view is updated;
a duration of time within which results of a received query are summarized; and
an identification of a number of rows in the sliding window view to keep populated;
generating a table associated with a sliding window view, wherein the table comprises one or more rows;
determining a time interval associated with each respective row of the one or more rows, wherein the time interval associated with each respective row comprises a start time;
identifying an interval associated with the sliding window view when a population timer expires;
resetting and restarting the population timer when it expires;
retrieving a query result summary for each respective row of the one or more rows, the query result summary comprising a summary of the query results obtained for a time interval beginning at the start time associated with the respective row and lasting for a duration of time within which results of the received query are summarized;
wherein retrieving the query result summary for at least one of the one or more rows comprises retrieving one or more prior query result summaries from a previously generated sliding window view, wherein the one or more prior query result summaries share a temporal relationship with the at least one row;
populating each respective row of the one or more rows with the retrieved query result summary associated with the respective row;
when the population timer expires, generating a new row within the sliding window view, wherein the new row represents a most recent time interval for which query results are available;
calculating the number of populated rows in the table;
determining whether the number of populated rows in the table is greater than the number of rows in the table to keep populated; and
removing a number of rows from the table if the number of populated rows in the table is greater than the number of rows in the table to keep populated, wherein the number of rows to remove from the table is equal to the difference between the number of populated rows and the number of rows in the table to keep populated.

14. The one or more non-transitory computer-readable media of claim 13, wherein each of the one or more rows in the table is associated with a period of time that is equivalent to the interval associated with the sliding window view.

15. The one or more non-transitory computer-readable media of claim 13, wherein each of the one or more rows in the table is associated with a predetermined portion of the interval associated with the sliding window view.

16. The one or more non-transitory computer-readable media of claim 13, wherein the number of rows removed from the table are removed from the table in an order from the oldest row in the table to the newest row in the table.

\* \* \* \* \*